(12) United States Patent
Hitomi

(10) Patent No.: US 6,344,291 B1
(45) Date of Patent: Feb. 5, 2002

(54) SOLID POLYMER ELECTROLYTE-CATALYST COMPOSITE ELECTRODE, ELECTRODE FOR FUEL CELL, AND PROCESS FOR PRODUCING THESE ELECTRODES

(75) Inventor: Syuzi Hitomi, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/199,822

(22) Filed: Nov. 25, 1998

(30) Foreign Application Priority Data

| | | |
|---|---|---|
| Nov. 25, 1997 | (JP) | 9-369873 |
| Feb. 26, 1998 | (JP) | 10-062221 |
| Mar. 13, 1998 | (JP) | 10-082592 |
| Jun. 18, 1998 | (JP) | 10-189807 |

(51) Int. Cl.$^7$ .................. H01M 4/86; H01M 4/90; H01M 4/96
(52) U.S. Cl. .................. 429/42; 429/43; 204/283; 204/290 R
(58) Field of Search .................. 429/42, 43; 204/283, 204/290 R

(56) References Cited

U.S. PATENT DOCUMENTS

| | | | |
|---|---|---|---|
| 4,546,010 A | 10/1985 | Killer et al. | 427/96 |
| 5,084,144 A | 1/1992 | Reddy et al. | 205/104 |
| 5,284,571 A | 2/1994 | Verbrugge | 205/118 |
| 5,294,232 A * | 3/1994 | Sakairi et al. | 429/42 |
| 5,538,585 A | 7/1996 | Wakita et al. | 156/308.2 |

FOREIGN PATENT DOCUMENTS

| | | |
|---|---|---|
| EP | 0 718 903 | 6/1996 |
| EP | 0 788 174 | 8/1997 |
| FR | 2 624 885 | 12/1987 |

OTHER PUBLICATIONS

Patent abstracts of Japan vol. 018, No. 658 (E–1643), Dec. 13, 1994, & JP 06 260170 A (Agency of IND Science & Technol; Others: 01), Sep. 16, 1994 Abstract, No Date.
Database WPI, Section Ck, Week 9442, Derwent Publications Ltd. London GB; Class A85 AN 94–336097 XP002097480 *Abstract, No Date.
JP 06 260170 A (Agency of IND SCI and Technology) Sep. 16, 1994 Abstract.
Database WPI Section Ch, Week 9607 Derwent Publications Ltd., London, GB,Class A85, AN96–066370 XP002097481. *Abstract, No Date.
JP 07 326365 A (Aisin Seiki KK) Dec. 12, 1995 *Abstract., No Date.

* cited by examiner

*Primary Examiner*—Kathryn Gorgos
*Assistant Examiner*—Thao Tran
(74) *Attorney, Agent, or Firm*—Sughrue Mion, PLLC

(57) ABSTRACT

A porous solid polymer electrolyte-catalyst composite electrode according to the present invention contains: a solid polymer electrolyte; a catalyst particles; an electron-conductive material which is supported on a proton-conductive area in the solid polymer electrolyte.

7 Claims, 8 Drawing Sheets

SOLID POLYMER ELECTROLYTE-CATALYST COMPOSITE ELECTRODE, ELECTRODE FOR FUEL CELL, AND PROCESS FOR PRODUCING THESE ELECTRODES

BACKGROUND OF THE INVENTION

1. Field of the Invention

The present invention relates to a solid polymer electrolyte-catalyst composite electrode, an electrode for a fuel cell and a process for producing these electrodes.

2. Description of the Related Art

As an electrochemical apparatus having an ion-exchange membrane as a solid electrolyte, for example, there are a solid polymer type water electrolysis cell and a solid polymer type fuel cell.

The solid polymer electrolyte type water electrolysis cell is an apparatus having an ion-exchange membrane, for example, such as perfluorosulfonic acid membrane as an electrolyte and an anode and a cathode connected to the respective side of the ion-exchange membrane which supplies oxygen from the anode and hydrogen from the cathode when D.C. voltage is applied across the both electrode while the anode is being supplied with water.

The electrochemical reactions which take place on the two electrodes will be described below.

Anode: $H_2O \rightarrow 1/2O_2 \, 30 \, 2H^+ + 2e^-$ 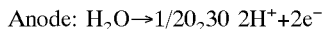

Cathode: $2H^+ + 2e^- \rightarrow H_2$ 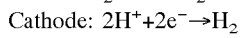

Total reaction: $H_2O \rightarrow H_2 + 1/2O_2$ 

It can be seen in these reaction formulae that the anode reaction proceeds only on a three-phase interface which allows the reception of water as an active material and the delivery of oxygen as a product, proton ($H^+$) and electron ($e^-$) at the same time while the cathode reaction proceeds only on a three-phase interface which allows the reception of proton ($H^+$) and electron ($e^-$) and the delivery of hydrogen at the same time.

On the other hand, the solid polymer electrolyte type fuel cell is an apparatus having an ion-exchange membrane, for example, such as perfluorosulfonic acid membrane as an electrolyte and an anode and a cathode connected to the respective side of the ion-exchange membrane which generates electricity due to electrochemical reaction developed by the supply of hydrogen to the anode and oxygen to the cathode.

The electrochemical reactions which take place on the two electrodes will be described below.

Anode: $H_2 \rightarrow 2H^+ + 2e^-$ 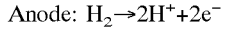

Cathode: $1/2O_2 + 2H^+ + 2e^- \rightarrow H_2O$ 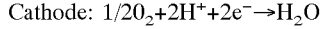

Total reaction: $H_2 + 1/2O_2 \rightarrow H_2O$ 

It can be seen in these reaction formulae that the both electrode reactions proceed only on a three-phase interface which allows the reception of gas (hydrogen or oxygen) and the delivery or reception of proton ($H^+$) and electron ($e^-$) at the same time.

An example of the electrode, used in the apparatus, having such a function is a solid polymer electrolyte-catalyst composite electrode comprising a solid polymer electrolyte and catalyst particles. The structure of this electrode with a fuel cell as an example will be explained.

FIG. 12 is an explanation view showing the structure of this electrode. This electrode is a porous electrode comprising catalyst particles 121 and a solid polymer electrolyte 122 three-dimensionally distributed in admixture and having a plurality of pores 123 formed thereinside. The catalyst particles form an electron-conductive channel, the solid electrolyte forms a proton-conductive channel, and the pore forms a channel for the supply and discharge of oxygen, hydrogen or water as product. The three channels are three-dimensionally distributed and numerous three-phase interfaces which allow the reception or delivery of gas, proton ($H^+$) and electron ($e^-$) at the same time are formed in the electrode, providing sites for electrode reaction. Incidentally, reference numeral 124 represents an ion-exchange membrane.

The preparation of an electrode having such a structure has heretofore been accomplished by the following process. There is a process which comprises applying a paste made of catalyst particles and a solution having PTFE particles (polytetrafluoro ethylene) dispersed therein to a polymer film or a carbon electrode substrate of an electro-conductive porous material to make a film (normally having a thickness of from 3 to 30 μm), heating and drying the film, and then applying a solid polymer electrolyte solution to the film so that the film is impregnated with the solution. Alternatively, there is a process which comprises applying a paste made of catalyst particles thereon, PTFE particles and a solid polymer electrolyte solution to a polymer film or a carbon electrode substrate of an electro-conductive porous material to make a film (normally having a thickness of from 3 to 30 μm), and then heating and drying the film. As the solid polymer electrolyte solution, there is used a solution obtained by dissolving the same composition as the aforementioned ion-exchange membrane in an alcohol. As the solution having PTFE particles dispersed therein, there is used a solution having PTFE particles having a particle diameter of about 0.23 μm dispersed therein.

The solid polymer electrolyte-catalyst composite electrode comprising metal particles of the platinum group or oxide particles of metal of the platinum group as a catalyst is used in a water electrolysis cell or a fuel cell. On the other hand, the solid polymer electrolyte-catalyst composite electrode comprising platinum group metal supported on carbon as a catalyst is used in a fuel cell.

The aforementioned solid polymer electrolyte-catalyst composite electrode has the following two disadvantages.

One of the two disadvantages is that the solid polymer electrolyte-catalyst composite electrode has a high resistivity. The reason of this disadvantage is as follows.

When catalyst particles are mixed with solid polymer electrolyte solution to prepare a paste, the catalyst particles are covered with solid polymer electrolyte film having no electronic conduction and a pore (void) 132 and a solid polymer electrolyte 133 exist between catalyst particles 131 even after film-making process to prepare an electrode. The formation of a continuous catalyst particle passage (electroconductive channel) is inhibited, though forming a continuous solid electrolyte passage (proton-conductive channel), as shown in the sectional view of electrode of FIG. 13.

The other disadvantage is that if a solid polymer electrolyte-catalyst composite electrode comprising the platinum group metal supported on carbon as a catalyst is used in an electrode for a fuel cell. The resulting percent utilization of catalyst supported on carbon is as low as about 10% as reported in Edson A. Tichianlli, "J. Electroanal. Chem.", 251, 275 (1998).

This is caused by the fact that the preparation process of supporting catalyst such as platinum on carbon particle, and then mixing the carbon particle with a solid polymer electrolyte.

In other words, the carbon particles as a support has a particle diameter as small as 30 nm. Thus, the carbon particle to be mixed with the solid polymer electrolyte has an aggregation of a few carbon particles that gives a carbon particle aggregate having a dense unevenness formed on the surface thereof. On the other hand, the solid electrolyte solution is viscous. Thus, regardless of which is used the process which comprises impregnating the layer having carbon particles and PTFE particles dispersed therein with a solid polymer electrolyte solution or the process which comprises the use of a paste obtained by mixing carbon particles, PTFE particles and a solid polymer electrolyte solution, the solid polymer electrolyte solution cannot penetrate deep into the central portion of the carbon particle aggregate. As a result, it is impossible to form a three-phase interface in the deep portion of the carbon particle aggregate. Accordingly, the catalyst particles disposed in the deep portion of the carbon particle aggregate does not take part in the electrode reaction to thereby cause decrease of percent utilization of catalyst.

The structure of such an electrode is shown in FIG. 14. As shown in FIG. 14, carbon particles 143 having catalyst particles 141, 142 supported thereon are aggregated to form a carbon particle aggregate (four of the carbon particles are shown forming the aggregate). Thus, the solid polymer electrolyte 144 can not penetrate into the central portion 145 of the indented portion. Accordingly, a catalyst particle 141 which is disposed at the surface of carbon in contact with the solid polymer electrolyte to effectively contribute to the electrode reaction and a catalyst particle 142 which does not come in contact with the solid polymer electrolyte and thus can not effectively contribute to the electrode reaction are formed in the catalyst particles.

SUMMARY OF THE INVENTION

It is an object of the present invention to decrease resistance of the electrode by adding the electro-conductive passage (electro-conductive channel) to the solid polymer electrolyte which has the proton-conductive passage inherently.

It is another object of the present invention is to improve the percent utilization of catalyst in the electrode for a fuel cell by improving the structure of microscopic three-phase boundary of the electrode.

A porous solid polymer electrolyte-catalyst composite electrode according to the present invention comprises: a solid polymer electrolyte; catalyst particles; an electro-conductive material which is supported on a proton-conductive passage in the solid polymer electrolyte.

An electrode for a fuel cell, comprises a solid polymer electrolyte-catalyst composite electrode containing a solid polymer electrolyte, carbon particles and a catalyst material; wherein the catalyst material is supported mainly on the site where the surface of the carbon particles contacts with a proton-conductive passage in the solid polymer electrolyte.

A process for the preparation of a solid polymer electrolyte-catalyst composite electrode, comprises the steps of: preparing a porous solid polymer electrolyte-catalyst composite electrode parent body comprising a solid polymer electrolyte and a catalyst particles; adsorbing a starting catalyst material compound into the solid polymer electrolyte in the electrode parent body; and reducing the starting catalyst material compound so that the catalyst material is deposited into the solid polymer electrolyte in the electrode.

A process for the preparation of an electrode for a fuel cell, comprises the steps of: a first step, adsorbing a starting catalyst material compound into the solid polymer electrolyte in a mixture including solid polymer electrolyte and carbon particle; and a second step, reducing the starting material catalyst material compound by chemical reduction. In the process, the operation of the first and second steps is repeated twice or more times.

DETAILED DESCRIPTION OF THE INVENTION

Figure 1:
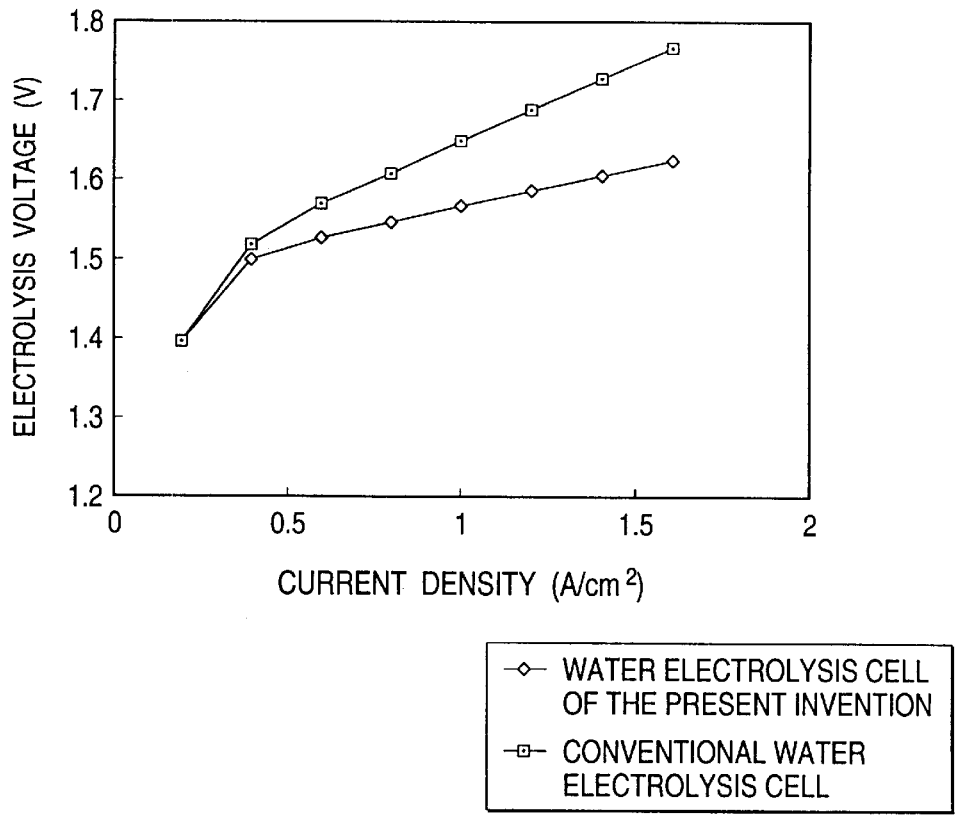
FIG. 1 is a graph illustrating an I-V characteristics of water electrolysis cells in Example 1.

Detailed description of the present invention will be described as follows referring to the accompanying drawings.

Firstly, the solid polymer electrolyte-catalyst composite electrode according to the present invention will be described. The solid polymer electrolyte-catalyst composite electrode according to the present invention contains a solid polymer electrolyte and catalyst particles incorporated therein as main components. The solid polymer electrolyte-catalyst composite electrode according to the present invention has catalyst particles three-dimensionally distributed in the solid polymer electrolyte-catalyst compound therein. The solid polymer electrolyte-catalyst composite electrode according to the present invention has numerous pores provided therein. In this arrangement, an electro-conductive material is supported into the ion-conductive passage in the solid polymer electrolyte. The solid polymer electrolyte-catalyst composite electrode according to the present invention can be prepared, e.g., by preparing a porous solid polymer electrolyte-catalyst composite electrode main body containing a solid polymer electrolyte and catalyst particles in the form of film by the foregoing conventional process, and then supporting an electro-conductive material on a proton-conductive passage present in the solid polymer electrolyte in the electrode main body by a chemical deposition method (see Eiichi Torigai, JP-B-58-47471 (The Term "JP-B" as used herein means an "examined Japanese patent publication"), Raymond Liu, "J. Electrochem. Soc.", 139, 15 (1992)). Thus, the process in which an electrode main body is prepared and then an electro-conductive material is supported on proton-conductive passage in solid polymer electrolyte in the electrode main body is simple and desirable. In accordance with this process, an electro-conductive material, too, can be supported on the inner surface of pores in the electrode. Further, a layer made of an electron-conductive material can be formed on the surface of the electrode main body. The supporting of an electro-conductive material on the inner surface of the pores in the electrode makes it possible to further improve the electric conductivity of the electrode to advantage. The formation of the layer made of an electro-conductive material on the surface of the electrode main body makes it possible to improve the current correcting or supplying characteristics to advantage.

It is desirable that the solid polymer electrolyte formed of an ion exchange resin. Of them, it is more desirable that its resin is a cation type ion exchange resin because of its low resistance. Particularly, when it is used in a water electrolysis cell or a fuel cell, a proton type such as a perfluorosulfonic acid type solid polymer electrolyte and a styrene-divinyl benzene suflonic acid type solid polymer is more preferable.

It is thought that if the solid polymer electrolyte is a perfluorosulfonic acid type solid polymer electrolyte, the proton is conducted through a cluster network, formed by hydrophilic ion-exchange functional group aggregated spherically with water (diameter: about 40 Å) and connected by channel (length: about 10 Å), dispersed three-dimensionally in hydrophobic fluorocarbon backbone. For example, ionic conductivity of this solid polymer electrolyte, etc. have long been studied and are further reported in S. C. Yeo and A. Eisenberg, "J. Apply. Polym. Sci.", 21, 875 (1997), T. D. Gierk. Paper 483 presented at The Electrochemical Society Meeting, Atlanta, Ga., Oct. 9–14, 1997, H. L. Yeger and A. Steck, "J. Electrochem. Soc.", 128, 1880 (1981), Z. Ogumi and T. Kuroe, "J. Electrochem. Soc.", 132. 2601 (1985), etc. From this standpoint of view, the supporting of an electron-conductive material in the cluster network of solid polymer electrolyte in the solid polymer electrolyte-catalyst composite electrode makes it possible to form a microscopic and three-dimensional electro-conductive channel in the electrode that provides the electrode with a drastically enhanced electronic conductivity, thereby giving good results.

As the electro-conductive material, there can be used any of various materials such as metal, electro-conductive metal oxide and electro-conductive polymer compound. It is preferable to use the platinum group metal such as Pt, Ir, Ru, Rh and Pd or metal oxide of the platinum group such as $IrO_2$, $Ir_2O_3$, $RuO_2$, $Ru_2O_3$, $RhO_2$, $Rh_2O_3$ and PdO, which have excellent chemical stability and act as a catalyst. The supporting of such an electron-conductive material can be accomplished, e.g., by an impregnation-reduction method in which a metal ion as a starting material of an electro-conductive material is adsorbed into a solid polymer electrolyte, followed reduction. In the case of usage of the platinum group metal as the electron-conductive material, a platinum group metal ion is adsorbed into a solid polymer electrolyte in the electrode by ion-exchange process and that ion is reduced by the borohydride salt solution, the amount of the platinum group metal supported in the cluster-network of solid polymer electrolyte increases with increasing the concentration of borohydride salt in the aqueous solution (see P. Millet, "J. Appl. Electrochem.", 25, 233 (1995)). In this case, by predetermining the concentration of the borohydride salt in the aqueous solution to not less than $2 \times 10^{-1}$ mol/l, the majority of platinum group metal can be deposited in the cluster network, making it possible to more effectively contribute to the enhancement of microscopic electric conduction of the electrode. If an electro-conductive material is mainly supported on the proton-conductive passage in the solid polymer electrolyte, use of hydrogen gas as the reducer for platinum group metal ion is preferable. The use of this process makes it possible to treat the solid polymer electrolyte-catalyst composite electrode parent body in dried state and hence inhibit the migration of adsorbed ion during reduction process. Accordingly, the electron-conductive material can be supported in uniformly all over the proton-conductive passage. In particular, this process is suitable for the use of perfluorosulfonic acid type solid polymer electrolyte.

Examples of the catalyst particle to be incorporated in the electrode include carbon particle, metal particle of the platinum group metal such as palladium, platinum and ruthenium, metal oxide particle of the platinum group, and a catalyst element supported on carbon. If necessary, a subsidiary component such as polytetrafluoroethylene (PTFE) particle may be added with catalyst.

In the case of using a catalyst element supported on carbon particle as the catalyst particle, carbon particle on which catalyst material is previously supported can be used. Alternatively, after forming an electrode parent body including carbon particle, the catalyst material is supported on the surface of the carbon particle simultaneously with when an electro-conductive material containing that catalyst material is supported at the ion-conductive passage in the solid polymer electrolyte.

For example, by these methods, it can be accomplished that the electrode contains the catalyst supported on carbon and electro-conductive material, including that catalyst, supported at ion-conductive passage in the solid polymer electrolyte. Accordingly, it is possible to obtain an electrode which the electric conductivity is high and the utilization efficiency of the catalyst is high because the catalyst material is supported at a portion which contacts with the ion conductive passage on the surface of carbon particle. Therefore, the electrode having such a configuration is preferable.

The solid polymer electrolyte-catalyst composite electrode according to the present invention can be used in a soda electrolysis cell, water electrolysis cell, fuel cell, etc. If it is used in a water electrolysis cell, the solid polymer electrolyte-catalyst composite electrode according to the present invention has an current correction in contact with the surface thereof. For example, electrodes of the present invention are connected to the both sides of an ion-exchange membrane as solid polymer electrolyte membrane. The current collectors are then provided in contact with the surface of the electrode. In this case, as current collectors to be used there may be used a material which is porous enough not to inhibit the supply of reactive material such as porous sintered titanium and porous sintered carbon which have heretofore been used. In particular, those having a pore diameter of not less than 100 $\mu$m are desirable. The current collector is preferably flat on the surface thereof in contact with the surface of the electrode to inhibit the formation of pinholes into ion-exchange membrane due to its unevenness. The material of the current collector is preferably titanium, stainless steel or titanium plated with platinum or gold, or the like.

If the solid polymer electrolyte-catalyst composite electrode according to the present invention is used in a fuel cell, the electrode of the present invention similarly is made of a current collector forming a gas diffusion layer provided in contact with the surface thereof. For example, the electrodes of the present invention are connected to the both sides of an ion-exchange membrane as solid polymer electrolyte membrane. The current collectors are then provided in contact with the surface of the electrode. In this case, too, as the collector to be used there may be used a material which is porous enough not to inhibit the supply of reactive material such as porous sintered titanium and porous sintered carbon which have heretofore been used. In particular, those having a pore diameter of not less than 100 $\mu$m are desirable. The current collector is preferably flat on the surface thereof in contact with the surface of the electrode to inhibit the formation of pinholes into the ion-exchange membrane due to its unevenness. The material of the current collector is preferably titanium, stainless steel, carbon or titanium plated with platinum or gold, or the like.

Next, the description will be made on an electrode of the above described solid polymer electrolyte-catalyst composite electrode, containing catalyst supported on carbon. The electrode having this structure is particularly preferable for an electrode of the fuel cell.

Figure 14:
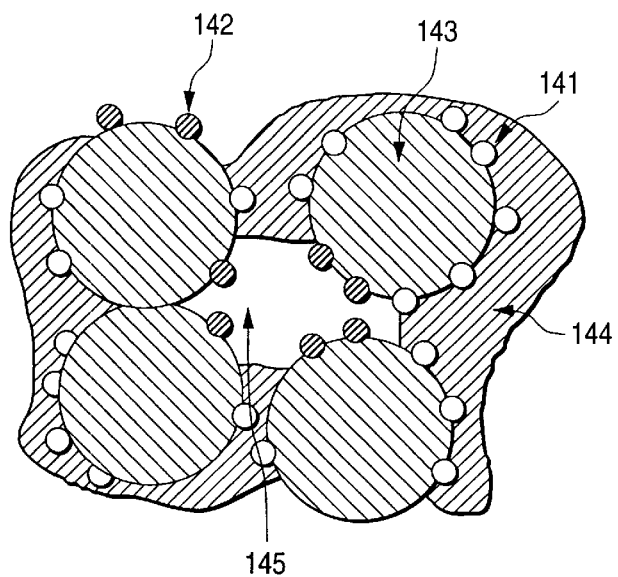
FIG. 14 is a conceptional diagram of the structure of a conventional electrode.

A mixture of a compound consisting of starting material of catalyst which undergoes reduction to produce a catalyst material, a solid polymer electrolyte and carbon particles is prepared. By a process for the chemical reduction of the compound consisting of starting material of catalyst in the mixture, it is possible to produce an electrode having a catalyst material supported mainly on the surface of carbon particle in contact with a solid polymer electrolyte (i.e., mainly composed of catalyst particle 141 as shown in FIG. 14). Accordingly, it is possible to enhance the percent of utilization of catalyst.

However, it is not enough for enhancement of the percent utilization of catalyst that studying for three-dimensionally dispersion of catalyst supported on carbon and solid polymer electrolyte in the electrode from a microscopic structural point of view.

In other words, as reported in H. L. Yeager et al., "J. Electrochem. Soc.", 128, 1880, (1981) and Ogumi et al., "J. Electrochem. Soc.", 132, 2601, (1985), a gas (hydrogen or oxygen) as a reaction active material and water as product at cathode, not to mention proton, are transported through a proton-conductive passage called cluster consisting of a hydrophilic ion-exchange functional group aggregated with water in a solid polymer electrolyte. Accordingly, the hydrophobic matrix which consists of a teflon background can not form a transportable passage of gas, water and proton. Thus, the inventors considered that the three-phase boundary on which the reaction of electrode for a fuel cell proceeds exists only on the site where the surface of the carbon particle contacts the proton-conductive passage in the solid polymer electrolyte. The inventors further found that the positional relationship of the catalyst material with the proton-conductive passage and the distribution of the catalyst material in the solid polymer electrolyte need to be studied.

Figure 15:
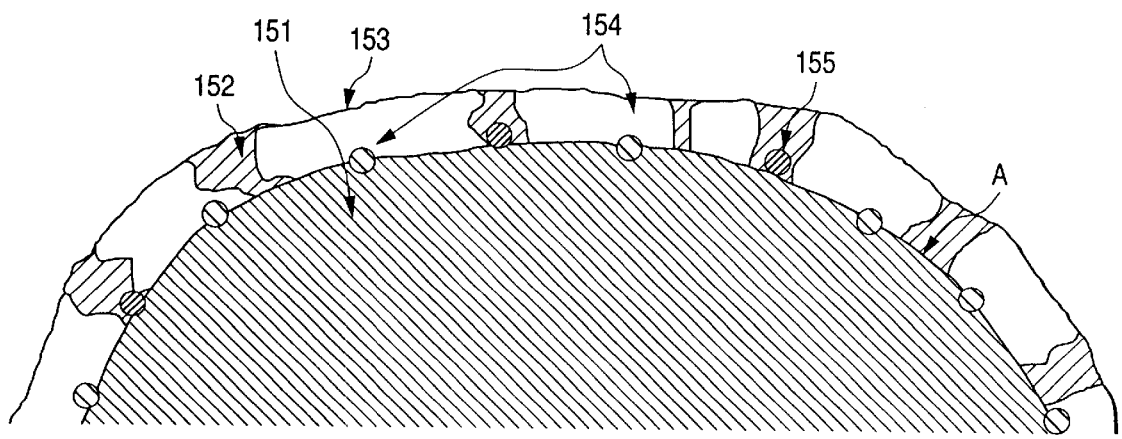
FIG. 15 is a conceptional diagram of the state of the surface layer in a conventional electrode.

FIG. 15 is a diagram illustrating the concept of the state of the surface of carbon particle in contact with a solid polymer electrolyte in a conventional electrode. In the conventional electrode, as shown in FIG. 15, the surface of the carbon particle 151 is covered with a solid polymer electrolyte composed of a proton-conductive passage 152 and a teflon backbone 153 and catalyst particles 154, 155 are supported on the surface of the carbon particle 151. However, it is considered that the catalyst particle 154 is disposed in the teflon backbone 153 and thus cannot effectively contribute to electrode reaction while the catalyst particle 155 is disposed in the proton-conductive passage 152 and thus can effectively contribute to the electrode reaction. The region A is a region where a three-phase boundary is formed but no catalyst particles are present. Thus, this region has no catalyst particles supported thereon and does not take part in the electrode reaction. In other words, in such an electrode, the presence of the catalyst particle 154 causes the decrease of percent utilization of catalyst and the presence of the three-phase boundary A causes the decrease of the activity of the electrode.

The structure of an electrode for a fuel cell which has been further improved in order to solve the above problems will be described referring to the drawing.

Figure 11:
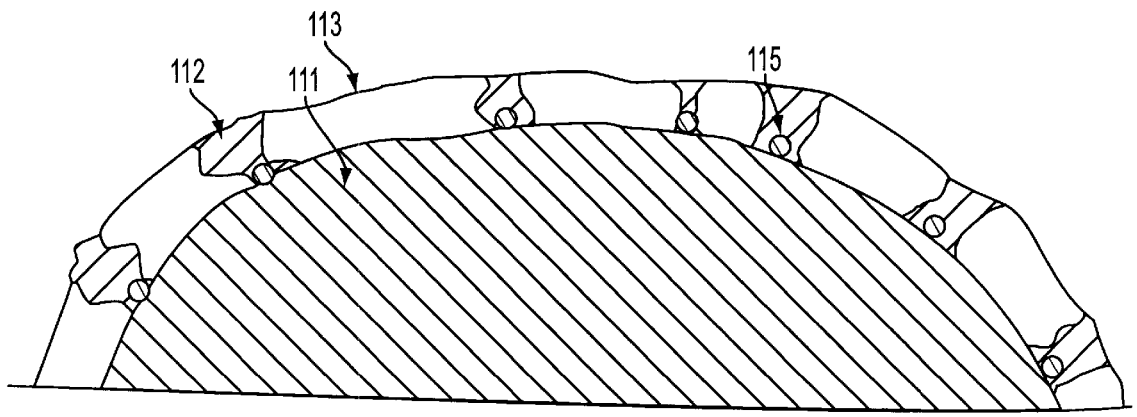
FIG. 11 is a conceptional diagram of the state of the surface layer of a carbon particle in contact with a solid polymer electrolyte in the electrode for a fuel cell according to the present invention.
Figure 12:
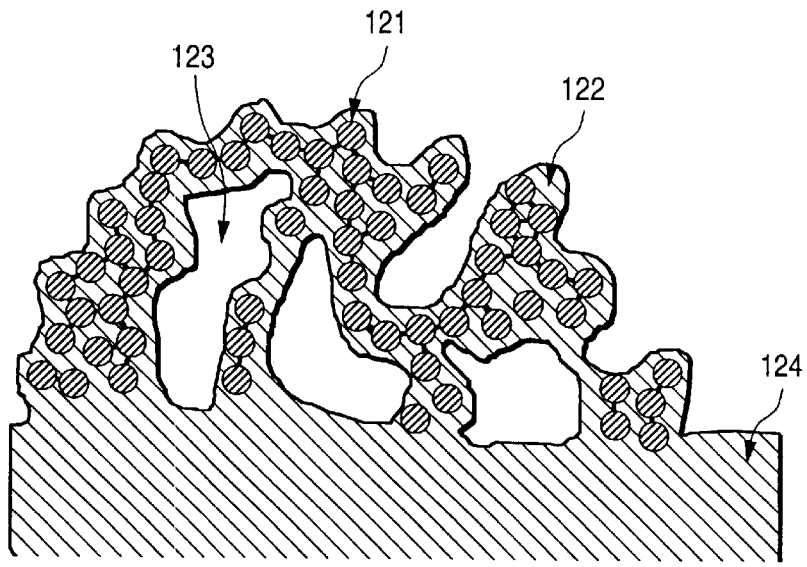
FIG. 12 is an explanation diagram showing the structure of a conventional electrode.
Figure 13:
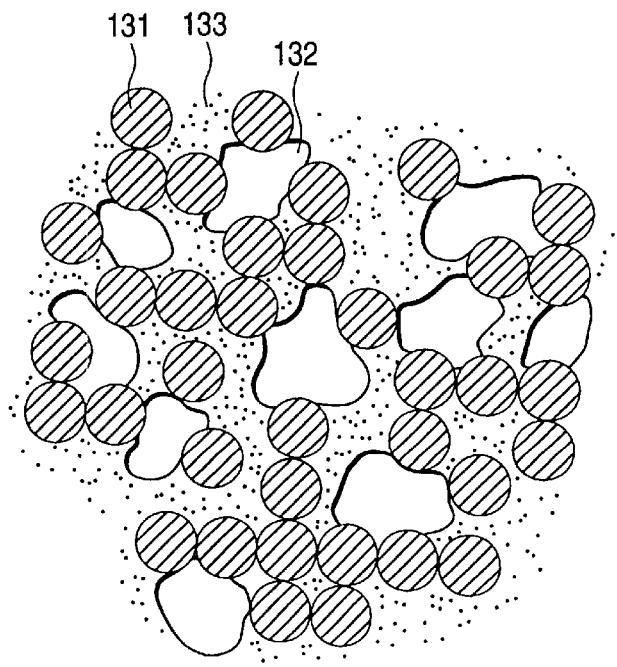
FIG. 13 is a conceptional diagram of the structure of a conventional electrode.

FIG. 11 is a diagram illustrating the concept of the state of the surface layer of a carbon particle in contact with a solid polymer electrolyte in the electrode for a fuel cell according to the present invention. The electrode of the present invention is a porous electrode containing a catalyst and a solid polymer electrolyte. The electrode has an electron-conductive channel formed by carbon particles, a proton-conductive channel formed by the solid polymer electrolyte and a channel for the supply and discharge of active material and product formed by numerous pores. As shown in FIG. 11, the carbon particle 111 covered with a solid polymer electrolyte composed of a proton-conductive passage 112 and a teflon backbone 113 thereof and a catalyst particle 115 supported on the site where the surface of the carbon particle 111 contacts the proton-conductive passage 112.

In accordance with the present invention, a catalyst material is supported mainly on the site where the surface of the carbon particles contacts the proton-conductive passage as mentioned above. In this arrangement, the catalyst is supported mainly on a three-phase boundary formed on the surface of the carbon particle, thereby enhancing the percent utilization of catalyst. Further, by supporting the catalyst material on the site where the surface of the carbon particle contacts the proton-conductive passage at a high percentage, the region A shown in FIG. 15 can be reduced, making it possible to enhance the activity of the electrode.

Further, as reported in the study by T. D. Gierke et al. (J. Membrane Sci., 13, 307 (1983)), the diameter of the cluster of proton-conductive passage is about 40 Å. From this standpoint of view, the average size of the catalyst material supported on the three-phase boundary is preferably not more than 40 Å to give a high efficiency, because there is no obstruction of the diffusion of water or gas.

Moreover, the catalyst material exhibits a great activity when it has a proper size. From this standpoint of view, the average size of the catalyst material supported on the foregoing contact surface preferably falls within the range of from 20 Å to 40 Å. It is reported in the study by K. Kinoshita et al. (J. Electrochem. Soc., 137, 845 (1990)) that the particle diameter of platinum particle having a high activity with respect to the reduction of oxygen is about 30 Å.

The catalyst material to be used in the electrode of the present invention is preferably the platinum group metal such as platinum, rhodium, ruthenium, iridium, palladium and osnium or alloy thereof. The solid polymer electrolyte to be used in the electrode of the present invention is preferably one made of an ion-exchange region, more preferably a perfluorosulfonic acid or styrene-divinylbenzene-based sulfonic acid type solid polymer electrolyte.

The preparation of such-an electrode for a fuel cell of the present invention can be accomplished by the process for the preparation of an electrode for a fuel cell having the following two steps. Namely, in a first step, a compound as starting material of catalyst is adsorbed into a solid polymer electrolyte in a mixture containing a solid polymer electrolyte and carbon particle. In a second step, the starting material of catalyst in mixture obtained in the first step is reduced by chemical reduction.

In the preparation process of the present invention, the operation of the first and second steps are repeated one or more times so that the catalyst material grows further with the catalyst material initially supported on the carbon particles as a core. The amount of catalyst material supported on the catalyst particle is controllable by the number of repetition. Accordingly, in accordance with the present invention, the controlling of the number of repetition of the operation of the first and second steps make it possible to prepare an electrode for a fuel cell composed of a high activity catalyst material having a size of from 20 to 40 Å supported thereon.

The preparation process of the present invention has been worked out paying attention to the following facts. Namely, first, catalyst material is gained by reduction of starting materia, adsorbed in solid polymer electrolyte of catalyst. Second, the carbon particle exhibits a catalytic activity for the reduction reaction of the foregoing compound. Third, by the ion exchange process of solid polymer electrolyte, the compound as starting material of catalyst can be adsorbed preferentially into the proton-conductive passage of solid polymer electrolyte. The preparation process of the present invention is not limited to the electrode of the present invention but can be applied to electrodes for a fuel cell having other structures.

The compound as starting material of catalyst to be used in the preparation process of the present invention is a compound which can be reduced to a catalyst material. The form or shape of the catalyst material is not specifically limited so far as the material acts as a catalyst. For example, the compound as starting material of catalyst may be one which can be reduced to metallic catalyst particle. Referring to the kind of catalyst, those having a high oxygen reduction activity or hydrogen reduction activity may be selected. One of the compound as starting material preferably used is a compound of the platinum group metals such as platinum, rhodium, ruthenium, iridium, palladium and osnium. In particular, the compound is preferably in the form of metal salt or complex, particularly an amine complex represented by $[M(NH_3)_4]X_2$ or $[M(NH_3)_6]X_4$ (in which M represents one of the platinum group metals and X represents a monovalent anion).

In case of using the metal compound, it may be in the form of a mixture of a few metal compounds or double salt. For example, a mixture of a platinum compound and a ruthenium compound can be expected to produce a platinum-ruthenium alloy when subjected to reduction.

The carbon particle preferably used is one which exhibits a high activity for the reduction of the compound as starting material of catalyst. For example, if a compound of a platinum group metal is used, an acetylene black such as Denka Black, Valcan XC-72 and Black Pearl 2000 are desirable.

The mixture composed of carbon particle and solid polymer electrolyte may preferably be in solid form. For example, it is prepared in the form of a porous material composed of a compound as starting material of catalyst dispersed in a parent body including a solid polymer electrolyte in the form of membrane or the like. The use of such a porous material is desirable.

The mixture composed of carbon particles and solid polymer electrolyte is preferably prepared by one of the following processes.

(1) The mixture is produced by a process in which a paste composed of carbon particle, a solid polymer electrolyte solution, and optionally a solution having a PTFE particle dispersed therein are applied to a polymer film to make a sheet made from the paste (preferably having a thickness of from 3 to 30 $\mu$m) which is then dried.

(2) The mixture is produced by a process in which a paste composed of carbon particle and a solution having a PTFE particle dispersed therein is applied to a polymer film to make a sheet made from the paste (preferably having a thickness of from 3 to 30 $\mu$m) which is then dried, and then a solid polymer electrolyte solution is applied to the sheet so that the sheet made from the paste is impregnated with the solid polymer electrolyte solution.

(3) The mixture is produced by a process in which a paste composed of carbon particle, a solid polymer electrolyte solution and optionally a solution having a PTFE particle dispersed therein is applied to a carbon electrode substrate which is electro-conductive porous material, and then the coated material is dried.

(4) The mixture is produced by a process in which a paste composed of carbon particle and a solution having a PTFE particle dispersed therein is applied to a carbon electrode substrate which is electro-conductive porous material, the coated material is heated and dried, and a solid polymer electrolyte solution is applied to the coated material so that the coated material is impregnated with the solid polymer electrolyte solution.

Alternatively, the mixture composed of carbon particle and a solid polymer electrolyte solution may be connected to both or either surface of the ion-exchange membrane.

The adsorption of the compound as starting material of catalyst at the first step is preferably accomplished by the ion-exchange process of a solid polymer electrode such that the compound as starting material is preferentially adsorbed into the proton-conductive passage in the solid polymer electrolyte.

The compound as starting material of catalyst in the mixture composed of a compound as starting material of catalyst, carbon particle and a solid polymer electrolyte is preferably reduced by a chemical reduction method using a reducing agent suitable for mass production, particularly gas phase reduction method using hydrogen gas or hydrogen-containing gas or gas phase reduction method using an inert gas containing hydrazine as a reducing agent.

In the reduction process, since the carbon particle exhibits a high catalytic activity for reduction reaction of the compound as starting material of catalyst, the compound as starting material of catalyst on the surface of the carbon particle is reduced in preference to the compound as starting material of catalyst in the solid polymer electrolyte. It is preferred that the kind of the reducing agent, the reduction pressure, the concentration of the reducing agent, the reduction time, and the reduction temperature be properly controlled to cause the compound as starting material of catalyst on the surface of the carbon particle to be preferentially reduced so that a catalyst material is produced mainly on the site where the surface of the carbon particle contacts the solid polymer electrolyte.

By using hydrogen as a reducing agent and controlling the reduction temperature, the compound as starting material of catalyst on the surface of the carbon particle can be more preferentially reduced, making it possible to produce a catalyst material mainly on the surface of carbon particle in contact with the solid polymer electrolyte. For example, the temperature of reduction of platinum amine complex $[Pt(NH_3)_4]^{2+}$ impregnated into a perfluorosulfonic acid type solid polymer electrolyte membrane with hydrogen is about 300° C., which is somewhat higher than the decomposition temperature (280° C.) of the perfluorosulfonic acid type solid polymer electrolyte. However, it is reported that the temperature of reduction of $[Pt(NH_3)_4]^{2+}$ adsorbed on the surface of carbon particle (Denka Black, Valcan XC-72, Black Pearl 2000, etc.) with hydrogen is 180° C. (K. Amine, M. Mizuhata, K. Oguro, H. Takenaka, J. Chem. Soc. Faraday Trans., 91, 4451 (1995)). In other words, by effecting reduction with hydrogen gas at a temperature of 180° C. with Valcan XC-72 as carbon particles and $[Pt(NH_3)_4]^{2+}$ as starting material of catalyst, it is made possible to prepare a solid polymer electrolyte-catalyst composite electrode consisting of a solid polymer electrolyte, carbon particle and a catalyst material, wherein catalyst material is supported mainly on the site where the surface of the carbon particle contacts a proton-conductive passage in the solid polymer electrolyte.

Thus, by selecting a proper starting material of catalyst and controlling the temperature of reduction with hydrogen gas, it is made possible to prepare a solid polymer electrolyte-catalyst composite electrode containing a solid polymer electrolyte, carbon particles and a catalyst material, in which catalyst material is supported mainly on the site where the surface of the carbon particle contacts a proton-conductive passage in the solid polymer electrolyte.

The temperature of reduction with hydrogen is preferably lower than the decomposition temperature of the solid polymer electrolyte, more preferably lower than the glass transition temperature of the solid polymer electrolyte to inhibit the degradation of the solid polymer electrolyte. Thus, the carbon particle and the starting material of catalyst are preferably selected and combined such that the temperature of reduction of the starting material of catalyst with hydrogen gas is lower than the decomposition temperature or glass transition temperature of the solid polymer electrolyte. An electrode for a fuel cell normally consists of a perfluorosulfonic acid type solid polymer electrolyte used therein. Such a perfluorosulfonic acid type solid polymer electrolyte has a decomposition temperature of 280° C. Accordingly, the reduction at a temperature of lower than this decomposition temperature makes it possible to inhibit the degradation of the solid polymer electrolyte in the electrode.

The starting material of catalyst which has been left unreduced in the solid polymer electrolyte can be extracted from the electrode by immersing the electrode into an acidic aqueous solution such as hydrochloric acid after reduction with hydrogen gas or the like.

EXAMPLES

The solid polymer electrolyte-catalyst composite electrode according to the present invention will be further described in the following examples.

Example 1

A solid polymer electrolyte-catalyst composite electrode and a water electrolysis cell using this electrode were prepared in the following manner.

An iridium particle as the catalyst and a solid polymer electrolyte solution (Nafion solution, produced Aldrich Corp.) were kneaded to prepare a paste. The paste was applied to an ethylene tetrafluoride-propylene hexafluoride copolymer (FEP) film to make a sheet which was then spontaneously dried. In this state, the weight ratio of iridium particle to solid polymer electrolyte was 8:92.

Subsequently, the catalyst layer formed on FEP film was immersed in $[Pd(NH_3)_4]Cl_2$ solution for 2 hours so that the catalyst material was adsorbed in a cluster network of solid polymer electrolyte. The catalyst material was reduced with hydrogen at a temperature of from 100° C. to 120° C. under a pressure of 30 kg/cm$^2$ so that palladium (Pd) was supported on the cluster network. The supported amount of palladium was about 2 mg per 1 g of the solid polymer electrolyte solution.

The solid polymer electrolyte-catalyst composite electrode on FEP film thus obtained was then bonded to both sides of a perfluorosulfonic acid type ion-exchange membrane (Nafion-115, produced by Du Pont) at a temperature of 130° C. under by hot press and FEP film was taken away to prepare an ion-exchange membrane-catalyst electrode assembly. The ion-exchange membrane-catalyst electrode assembly thus prepared was then mounted on a water electrolysis cell holder. For comparison, an ion-exchange membrane-catalyst electrode assembly having the same structure as the ion-exchange membrane-catalyst electrode assembly of the present example except that palladium was not supported on the cluster network was mounted on another water electrolysis cell holder. The two water electrolysis cells were then measured for I-V characteristics. The results are set forth in FIG. 1.

It can be seen in FIG. 1 that the characteristics of the water electrolysis cell using the solid polymer electrolyte-catalyst composite electrode obtained according to the present invention exhibits very excellent characteristics as compared with that of the conventional water electrolysis cell mainly due to the reduction of the internal resistance of the electrode as made obvious from the gradient of I-V curve.

Example 2

(Example Electrode A)

An iridium particle as the catalyst and a solid polymer electrolyte solution (Nafion solution, produced Aldrich Corp.) were kneaded to prepare a paste. The paste was applied to an FEP (ethylene tetrafluoride-propylene hexafluoride copolymer) film to make a sheet which was then spontaneously dried to prepare a solid polymer electrolyte-catalyst composite electrode main body. The electrode thus prepared had a square plane (32 mm×32 mm) and a thickness of 10 μm. In this state, the weight ratio of iridium particle to solid polymer electrolyte was 75:25, and the content of iridium per unit area was 1.5 mg per 1 cm$^2$ of electrode. Subsequently, the solid polymer electrolyte-catalyst composite electrode main body formed on FEP film was immersed into $[Pd(NH_3)_4]Cl_2$ solution for 2 hours so that $[Pd(NH_3)_4]^{2+}$ was adsorbed into a cluster network of solid polymer electrolyte. The catalyst material was then reduced with hydrogen at a temperature of from 100° C. to 120° C. under a pressure of 30 kg/cm$^2$ so that palladium (Pd) was supported on the cluster network. The supported amount of palladium was about 5 mg per 1 g of the solid polymer electrolyte solution.

The electrode thus prepared will be hereinafter referred to as "Example Electrode A".

Figure 3:
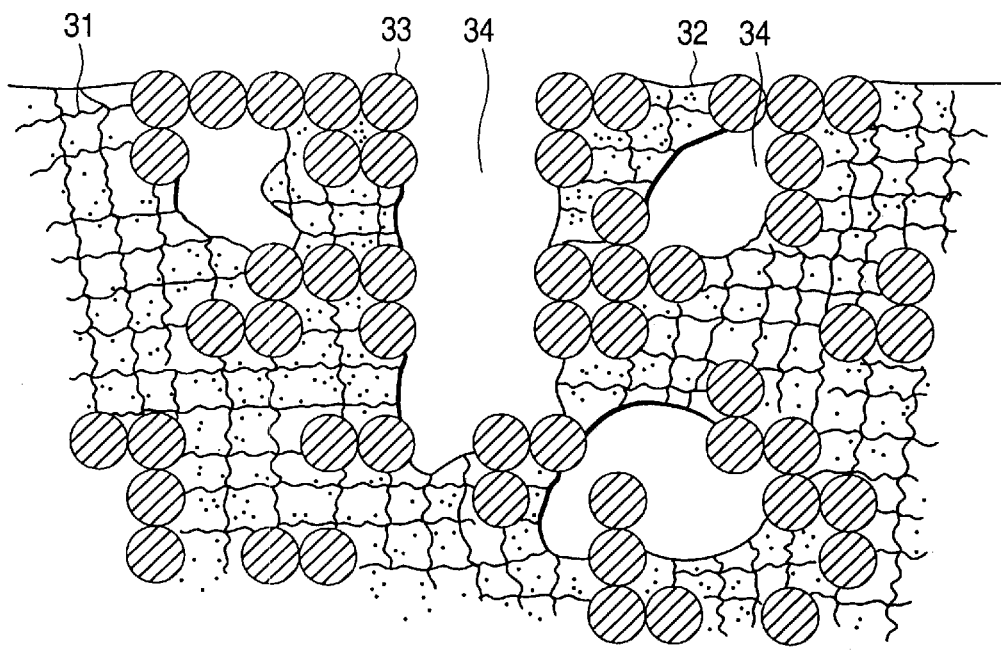
FIG. 3 is a sectional view illustrating the structure of Example Electrode A.

FIG. 3 is a sectional view illustrating the structure of Example Electrode A. As shown in FIG. 3, the electrode of the present example is a porous solid polymer electrolyte-catalyst composite electrode having numerous pores 34 (pore diameter of from about 10 μm to 20 μm) formed by a solid polymer electrolyte 32 and a catalyst particle 33 as iridium particle (average particle diameter: 5 μm) and a palladium electron-conductive channel 31 (channel diameter: about 50 Å) formed by supporting palladium-in the cluster network in the solid polymer electrolyte 32.
(Comparative Electrode C)

A iridium particle and a solid polymer electrolyte solution (Nafion solution, produced Aldrich Corp.) were kneaded to prepare a paste. The paste was applied to an FEP film to make a sheet which was then spontaneously dried to prepare a solid polymer electrolyte-catalyst composite electrode. The electrode thus prepared will be hereinafter referred to as "Comparative Electrode C". Comparative Electrode C had a square shape (32 mm×32 mm) and a thickness of 10 μm. In this state, the weight ratio of iridium particle to solid polymer electrolyte was 75:25, and the content of iridium particle per unit area was 1.5 mg per 1 $cm^2$ of electrode. Comparative Electrode C had the same structure as Example Electrode A except that no palladium electron-conductive channel was formed.

Example Electrode A and Comparative Electrode C were then measured for resistivity. As a result, the resistance of Electrode A of $0.4 \times 10^4$ mΩ·cm while the resistance of Comparative Electrode C was $4.5 \times 10^4$ mΩ·cm.
(Water Electrolysis Cell)

Example Electrode A and Comparative Electrode C thus obtained were then used to prepare a water electrolysis cell having the following structure. Example Electrode A and Comparative Electrode C on FEP film were each bonded to both sides of a perfluorosulfonic acid type ion-exchange membrane (Nafion-112, produced by Du Pont) at a temperature of 130° C. under a hot press and FEP film was taken away to prepare an ion-exchange membrane-catalyst electrode assembly which was then mounted on a water electrolysis cell holder.

Figure 4:
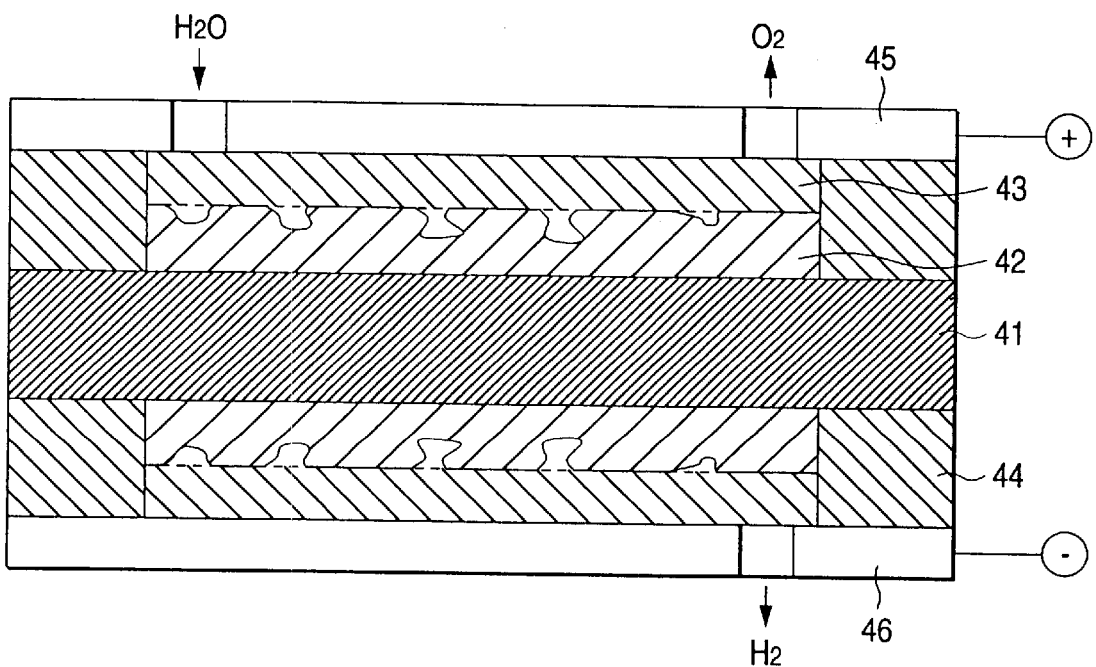
FIG. 4 is a schematic diagram illustrating the structure of a water electrolysis cell in Example 2.
Figure 5:
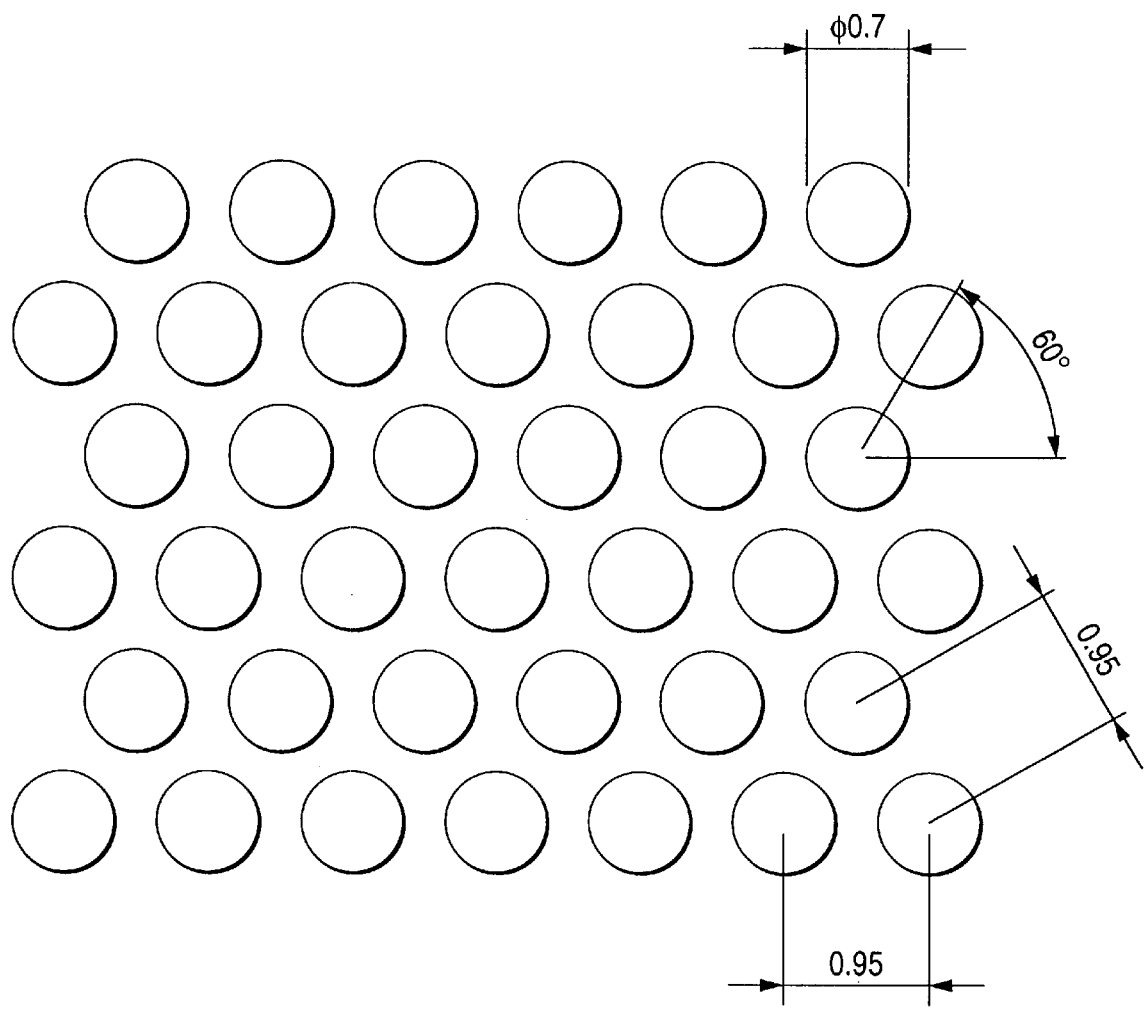
FIG. 5 is a schematic diagram illustrating the structure of a titanium plate shown in FIG. 4.

FIG. 4 is a schematic diagram illustrating the structure of the water electrolysis cell thus obtained. As shown in FIG. 4, the water electrolysis cell is composed of an current collector 43 provided in contact with an electrode 42 in an ion-exchange membrane-catalyst electrode assembly having the electrode 42 connected to both sides of an ion-exchange membrane 41, a packing 44 provided therearound, and a titanium anode plate 45 and a titanium cathode plate 46 pressured-welded thereto. The current collector 43 is made of a titanium plate (shown by the dotted line) and an expanded titanium (shown by the corrugated line). The titanium plate had photoetched holes having a diameter φ of 0.7 mm arranged in zigzag manner at a pitch of 0.95 mm (P: 60°) in a planar titanium plate having a thickness of 0.15 mm as shown in FIG. 5 (porosity: 49%). The titanium plate had been plated with platinum on both sides thereof to a thickness of 0.15 μm. Two sheets of expanded titanium were laminated on the titanium plate.

Figure 2:
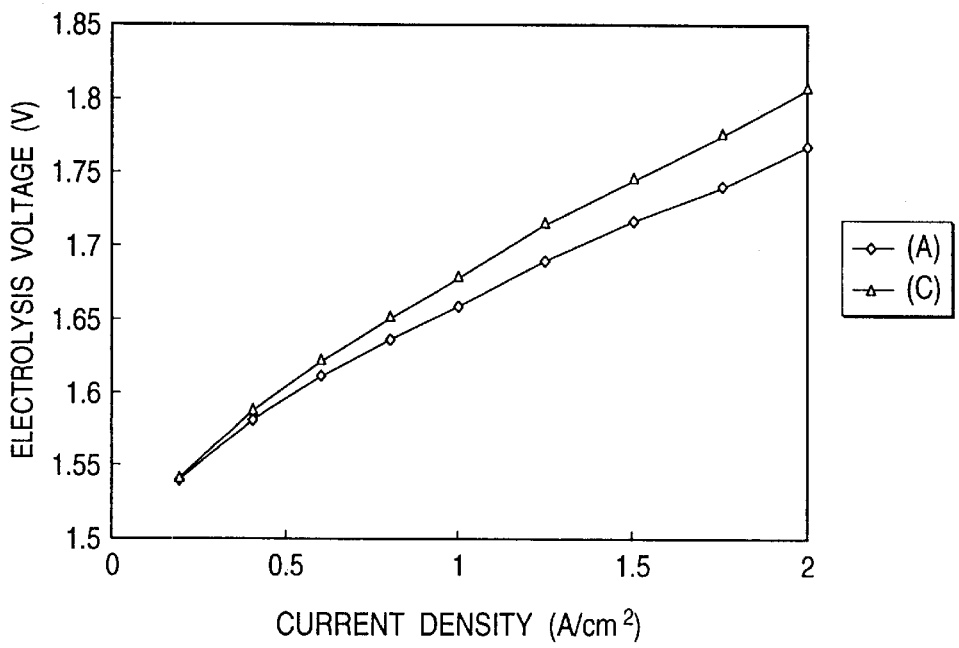
FIG. 2 is a graph illustrating an I-V characteristics of water electrolysis cells in Example 2.

FIG. 2 illustrates the current-voltage characteristics of these water electrolysis cells. In FIG. 2, the curve A indicates the characteristics of the water electrolysis cell composed of Example Electrode A while the curve C indicates the characteristics of the water -electrolysis cell composed of Comparative Electrode C.

It can be seen in FIG. 2 that the water electrolysis cell composed of Example Electrode A exhibits excellent characteristics, a lower electrolysis voltage and a higher energy conversion efficiency as compared with the water electrolysis cell composed of Comparative Electrode C. This is attributed to the fact that the resistance of the electrode is reduced due to the microscopic electron-conductive channel of Pd formed in the cluster network in the electrode of the present example.

Example 3

A solid polymer electrolyte-catalyst composite electrode and a fuel cell using the electrode were prepared in the following manner.

A carbon particle having 30 wt % of platinum supported thereon and a solution having PTFE dispersed therein were kneaded to make a paste. The paste was applied to an FEP film to make a sheet which was then heated and dried at a temperature of 120° C. for 2 hours.

The sheet thus obtained was then allowed to cool. A perfluorosulfonic acid type solid polymer electrolyte (Nafion solution, produced Aldrich Corp.) was then sprayed onto the sheet so that the sheet was impregnated with the solid polymer electrolyte. The material was then spontaneously dried. In this state, the weight ratio of platinum-supported carbon, PTFE and solid polymer electrolyte was 60:22:18.

The catalyst layer formed on FEP film was immersed into $[Pd(NH_3)_4]Cl_2$ solution for 2 hours so that the catalyst material was adsorbed into a cluster network of solid polymer electrolyte. The catalyst material was reduced with hydrogen at a temperature of from 100° C. to 120° C. under a pressure of 30 kg/$cm^2$ so that palladium (Pd) was supported on the cluster network. The supported amount of palladium was about 2 mg per 1 g of the solid polymer electrolyte solution.

The solid polymer electrolyte-catalyst composite electrode on FEP film thus obtained was then bonded to both sides of a perfluorosulfonic acid type ion-exchange membrane (Nafion-115, produced by Du Pont) at a temperature of 130° C. under a hot press and FEP film was taken away to prepare an ion-exchange membrane-catalyst electrode assembly. A hydrophobicized porous carbon paper as a gas diffusion layer was then similarly connected to both external sides of the ion-exchange membrane-catalyst electrode assembly by hot press. The laminate thus prepared was then mounted on a fuel cell holder. For comparison, an ion-exchange membrane-catalyst electrode assembly having the same structure as the ion-exchange membrane-catalyst electrode assembly of the present example except that palladium was not supported on the cluster network was mounted on another water fuel cell holder. The two fuel cells were then measured for I-V characteristics. The results are set forth in FIG. 6.

Figure 6:
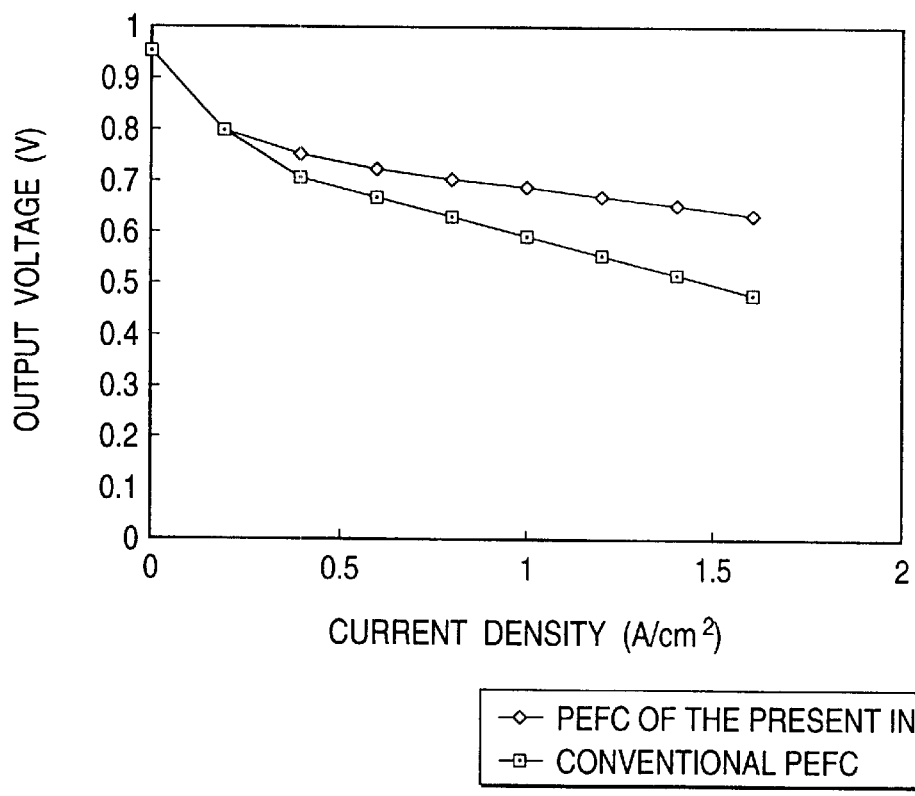
FIG. 6 is a graph illustrating an I-V characteristic of fuel cells in Example 3.

It can be seen in FIG. 6 that the characteristics of the fuel cell using the solid polymer electrolyte-catalyst composite electrode obtained according to the present invention exhibits very excellent characteristics as compared with that of the conventional water electrolysis cell mainly due to the reduction of the internal resistivity of the electrode as made obvious from the gradient of I-V curve.

Example 4

(Example Electrode E)

A carbon particles having 30 wt % of platinum supported thereon and a solution having a PTFE particle dispersed therein were kneaded to make a paste. The paste was applied to an ethylene tetrafluoride-propylene hexafluoride copolymer (FEP) film to make a sheet which was then heated and dried at a temperature of 120° C. for 2 hours. Subsequently, the sheet was spontaneously dried. A perfluorosulfonic acid type solid polymer electrolyte (Nafion solution, produced Aldrich Corp.) was then sprayed onto the sheet so that the sheet was impregnated with the solid polymer electrolyte to prepare a solid polymer electrolyte-catalyst composite electrode main body. The electrode main body was then spontaneously dried. The electrode main body had a square plane (32 mm×32 mm) and a thickness of 10 μm. In this state, the weight ratio of platinum-supported carbon, PTFE and solid polymer electrolyte was 60:22:18, and the content of platinum per unit area was 0.1 mg per 1 cm² of electrode.

Subsequently, the solid polymer electrolyte-catalyst composite electrode main body formed on FEP film was immersed into [Pt(NH$_3$)$_4$)] solution for 2 hours so that [Pt(NH$_3$)$_4$)]0 was adsorbed into a cluster network of solid polymer electrolyte. The catalyst material was then reduced with hydrogen at a temperature of from 100° C. to 120° C. under a pressure of 30 kg/cm² so that palladium (Pd) was supported on the cluster network. The supported amount of palladium was about 5 mg per 1 g of the solid polymer electrolyte solution.

The electrode thus prepared will be hereinafter referred to as "Example Electrode E".

Figure 8:
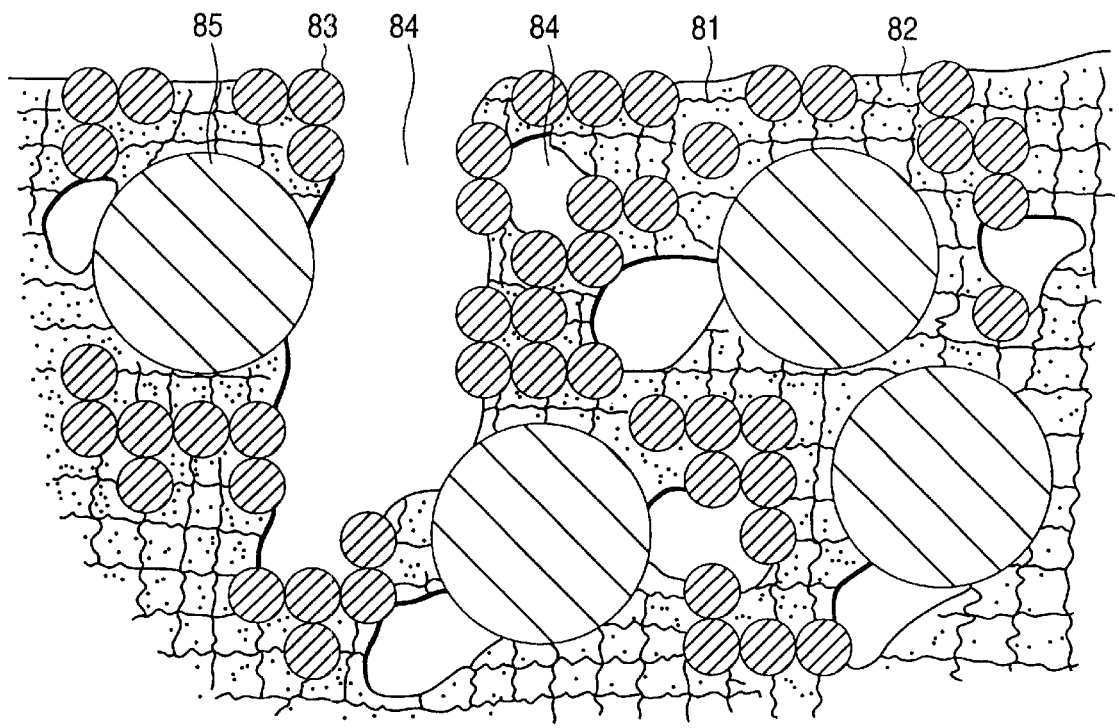
FIG. 8 is a sectional view illustrating the structure of Example Electrode E.

FIG. 8 is a sectional view illustrating the structure of Example Electrode E. As shown in FIG. 8, the electrode of the present example is a porous solid polymer electrolyte-catalyst composite electrode having numerous pores 84 (pore diameter of from about 5 μm to 20 μm) formed by a solid polymer electrolyte 82 and a catalyst particles 83 formed by a platinum supported on carbon powder (average particle diameter: not more than 0.21 μm) and PTFE particle 85 and a palladium electron-conductive channel 81 (channel diameter: about 50 Å) formed by supporting palladium in the cluster network in the solid polymer electrolyte 82.

(Comparative Electrode G)

A carbon powder having 30 wt % of platinum supported thereon and a solution having a PTFE particle dispersed therein were kneaded to make a paste. The paste was applied to an ethylene tetrafluoride-propylene hexafluoride copolymer (FEP) film to make a sheet which was then heated and dried at a temperature of 120° C. for 2 hours. Subsequently, the sheet was allowed to cool. A perfluorosulfonic acid type solid polymer electrolyte (Nafion solution, produced Aldrich Corp.) was then sprayed onto the sheet so that the sheet was impregnated with the solid polymer electrolyte to prepare a solid polymer electrolyte-catalyst composite electrode main body. The electrode main body had a square plane (32 mm×32 mm) and a thickness of 10 μm. In this state, the weight ratio of platinum-supported carbon, PTFE and solid polymer electrolyte was 60:22:18, and the content of platinum per unit area was 0.1 mg per 1 cm² of electrode. Comparative Electrode E had the same structure as Example Electrode E except that no palladium electron-conductive channel was formed.

Example Electrode E and Comparative Electrode G were then measured for, resistance of electrodes. As a result, Example resistance of Electrode E was 2.5×10⁴ mΩ·cm while resistance of Comparative Electrode G was 7.5×10⁴ mΩ·cm.

(Fuel Cell)

Example Electrode E and Comparative Electrode G thus obtained were then used to prepare a fuel cell having the following structure. In some detail, Example Electrode E and Comparative Electrode G on FEP film were each connected to both sides of a perfluorosulfonic acid type ion-exchange membrane (Nafion-112, produced by Du Pont) at a temperature of 130° C. under a hot press and FEP film was taken away to prepare an ion-exchange membrane-catalyst electrode assembly which was then mounted on a fuel cell.

Figure 9:
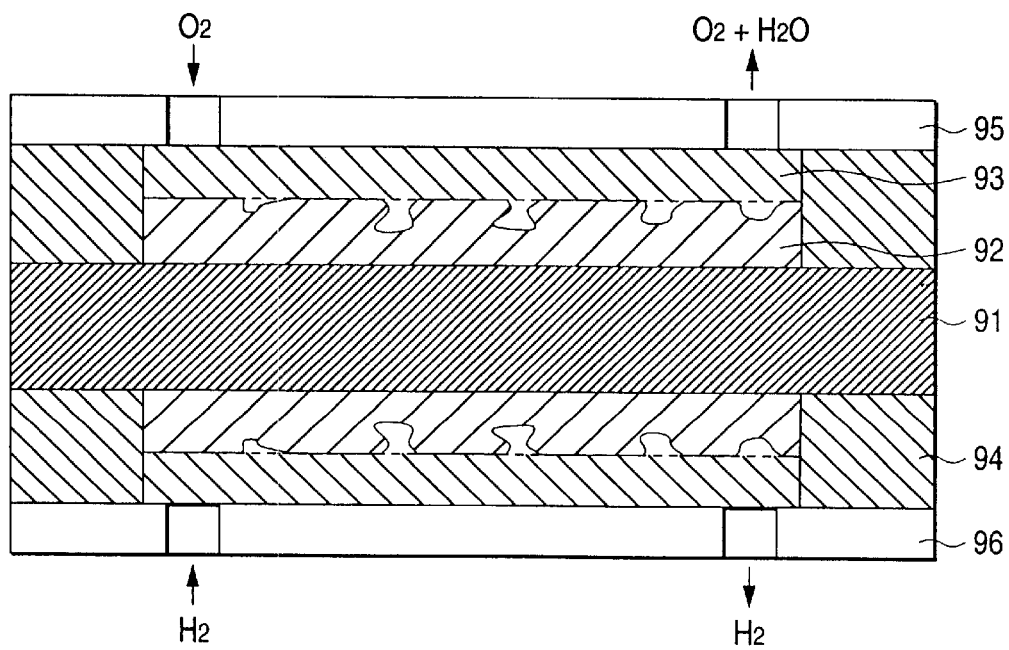
FIG. 9 is a schematic diagram illustrating the structure of a fuel cell obtained in Example 4.

FIG. 9 is a schematic diagram illustrating the structure of the fuel cell thus obtained. As shown in FIG. 9, the fuel cell is composed of a current collector 93 forming a gas diffusion layer provided in contact with an electrode 92 in an ion-exchange membrane-catalyst electrode assembly including the electrode 92 bonded to both sides of an ion-exchange membrane 91, a packing 94 provided therearound, and a graphite positive electrode plate 95 and a graphite negative electrode plate 96 pressured-welded thereto. The current collector 93 is composed of a titanium plate (shown by the dotted line) and an expanded titanium (shown by the corrugated line). The titanium plate had photoetched holes having a diameter of φ40.7 mm arranged in staggered manner at a pitch of 0.95 mm (P: 60°) in a planar titanium plate having a thickness of 0.15 mm as shown in FIG. 5 (porosity: 49%). The titanium plate had been plated with platinum on both sides thereof to a thickness of 0.15 μm. Two sheets of expanded titanium had been laminated on the titanium plate.

Figure 7:
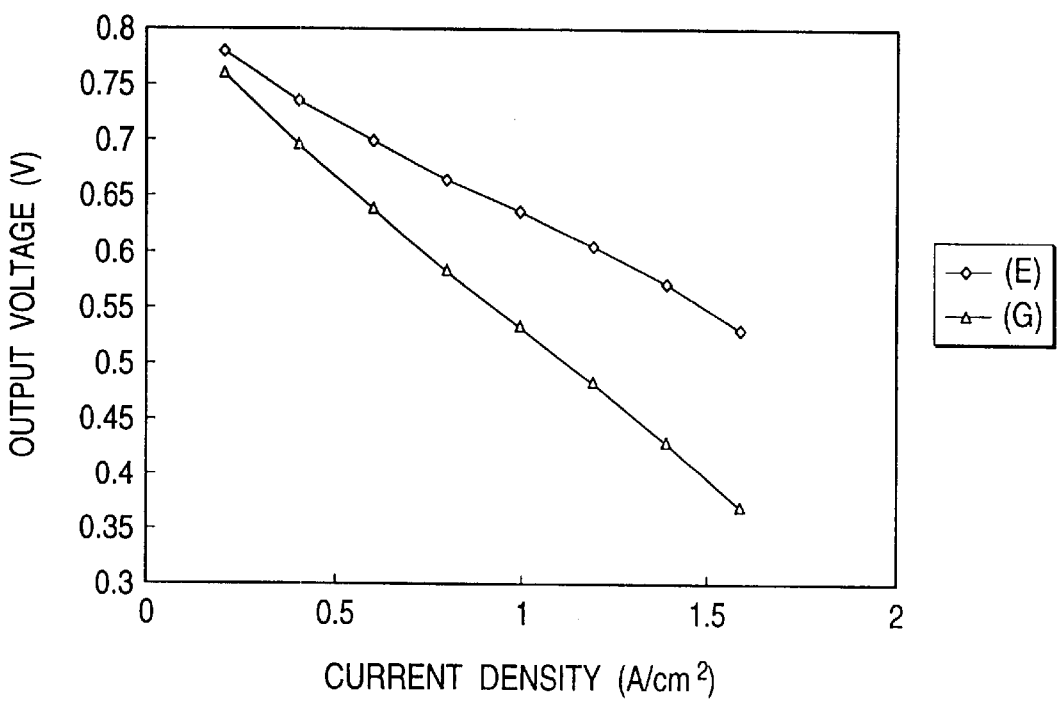
FIG. 7 is a graph illustrating the I-V characteristics of fuel cells in Example 4.

FIG. 7 illustrates the current-voltage characteristics of these fuel cells. In FIG. 7, the curve E indicates the characteristics of the fuel cell using Example Electrode E while the curve G indicates the characteristics of the fuel cell using Comparative Electrode G.

It can be seen in FIG. 7 that the fuel cell consisting of Example Electrode E exhibits excellent characteristics as compared with the fuel cell using Comparative Electrode G, demonstrating that it exhibits a small loss of operating voltage. This is attributed to the fact that the specific resistance of the electrode is reduced and the resistance of the entire fuel cell is kept small due to the microscopic electron-conductive channel of palladium (Pd) formed in the cluster network in the electrode of the present example.

The electrode for a fuel cell according to the present invention will be further described in the following preferred examples.

Example 5

(Example Electrode I)

A solid polymer electrolyte (5 wt % solution of Nafion, produced Aldrich Corp.), a carbon particle (Valcan XC-72 (produced by Tanaka Kikinzoku, Ltd.)) and a PTFE particle (Teflon 30J, produced by Mitsui Du Pont Fluorochemical Co., Ltd.) were kneaded to make a paste. The paste was applied to a porous carbon electrode substrate (0.5 mm), and then dried at a temperature of 120° C. in a nitrogen atmosphere for 1 hour.

Subsequently, the foregoing mixture consisting of solid polymer electrolyte and carbon particle which has high electro-conductivity was immersed in [Pt(NH$_3$)$_4$]Cl$_2$ solution for 2 days to undergo ion exchange so that [Pt(NH$_3$)$_4$]$^{2+}$ was adsorbed into the proton-conductive passage of solid polymer electrolyte. The mixture was thoroughly washed with purified water, dried, and then reduced at a temperature of 180° C. in a hydrogen atmosphere for about 4 hours so that platinum was supported preferentially on the site where the surface of the carbon particle contacts the proton-conductive passage in solid polymer electrolyte. Subsequently, the catalyst material was immersed in a 3 mol/l hydrochloric acid solution overnight to extract [Pt(NH$_3$)$_4$]Cl$_2$ unreduced. Thus, Electrode I of the present example was obtained. An analysis separately conducted shows that the amount of platinum supported on Electrode I is about 0.05 mg/cm².

Example 6

(Example Electrode J)

A solid polymer electrolyte (5 wt % solution of Nafion, produced Aldrich Corp.), a carbon particle (Valcan XC-72

(produced by Tanaka Kikinzoku K.K.)) and a PTFE particle (Teflon 30J, produced by Mitsui Du Pont Fluorochemical Co., Ltd.) were kneaded to make a paste. The paste was applied to a hydrophobic electro-conductive porous carbon electrode substrate (0.5 mm), and then dried at a temperature of 120° C. in a nitrogen atmosphere for 1 hour.

Subsequently, the foregoing mixture consisting of solid polymer electrolyte and carbon particle was immersed in $[Pt(NH_3)_4]Cl_2$ solution for 2 days to undergo ion exchange so that $[Pt(NH_3)_4]^{2+}$ was immersed into the proton-conductive passage of solid polymer electrolyte. The catalyst material was thoroughly washed with purified water, dried, and then reduced in a nitrogen gas containing anhydrous hydrazine (obtained by bubbling hydrazine with nitrogen gas) for about 30 minutes so that platinum was supported preferentially on the site where the surface of the carbon particle and the surface of the solid polymer electrolyte contacts the proton-conductive passage. Subsequently, the mixture was immersed into a 3 mol/l hydrochloric acid solution overnight to extract $[Pt(NH_3)_4]Cl_2$ unreduced. Thus, Electrode J of the present example was obtained. An analysis separately conducted shows that the amount of platinum supported on Electrode J is about 0.05 mg/cm$^2$.

(Comparative Example Electrode K)

A platinum-supported carbon (produced by Tanaka Kikinzoku K.K.; 10V30E: Valcan XC-72 having 30 wt % of platinum supported thereon), a solid polymer electrolyte (5 wt % solution of Nafion, produced Aldrich Corp.) and PTFE particle (Teflon 30J, produced by Mitsui Du Pont Fluorochemical Co., Ltd.) were kneaded to make a paste. The paste was applied to a hydrophobic electro-conductive porous carbon electrode substrate (0.5 mm), and then dried at a temperature of 120° C. in a nitrogen atmosphere for 1 hour to obtain Comparative Electrode K.

The amount of the platinum-supported carbon to be used during the preparation of paste was properly adjusted such that the amount of platinum in Electrode K was about 1.0 mg/cm$^2$.

Example Electrode J and Comparative Electrode K were each connected to both sides of an ion-exchange membrane (produced by Du Pont; Nafion, thickness: about 50 μm). These assemblies were each then mounted on a unit fuel cell holder to obtain fuel cells I, J and K.

Figure 10:
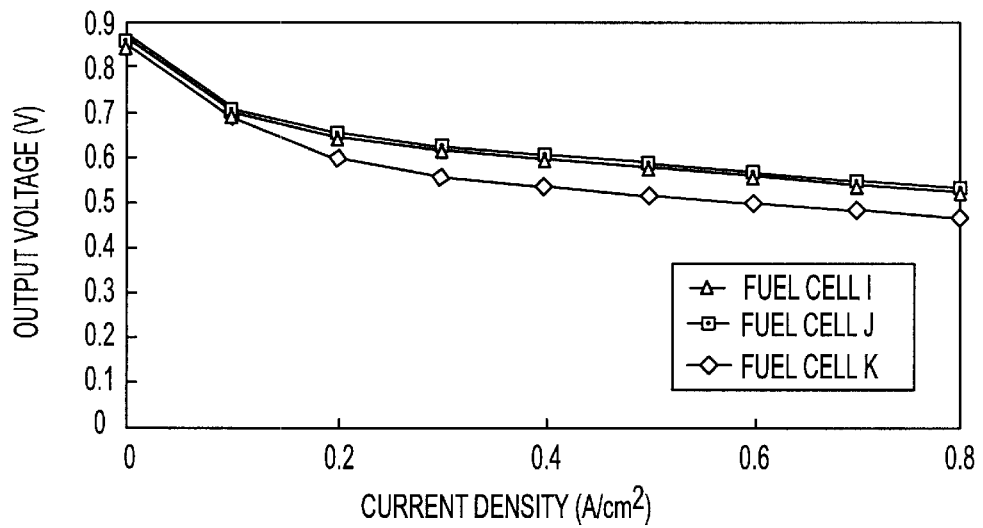
FIG. 10 is a graph illustrating the I-V characteristics in Example 5.

FIG. 10 illustrates the current-voltage characteristics developed when these cells are supplied with oxygen and hydrogen (2 atm., 80° C.).

It can be seen in FIG. 10 that the cells I and J according to the present invention exhibit a high output voltage in spite of its supported amount of platinum as small as not more than 1/10 of that of the comparative cell K. This is attributed to the fact that platinum can be certainly supported on the three-phase boundary of electrode to give a drastically high percent utilization of platinum, making it possible to obtain an electrode outperforming the conventional cell in spite of small supported amount of platinum.

The solid polymer electrolyte-catalyst composite electrode according to the present invention can provide a solid polymer electrolyte-catalyst composite electrode having a high electro-conductivity and a small resistance. If the solid polymer electrolyte-catalyst composite electrode according to the present invention is used in a water electrolysis cell, for example, the resulting water electrolysis cell can be provided with a lowered electrolysis voltage and an enhanced energy efficiency. On the other hand, if the solid polymer electrolyte-catalyst composite electrode according to the present invention is used in a fuel cell, the resulting fuel cell allows greater current to be taken out while suppressing the decrease of operating voltage.

The electrode for a fuel cell of the present invention can provide an electrode having a high percent utilization of catalyst that makes it possible to prepare an inexpensive high performance fuel cell.

In accordance with the process for the preparation of an electrode for a fuel cell of the present invention, a catalyst material is supported on a three-phase boundary formed on the surface layer of carbon particle, making it possible to allow all catalyst materials to effectively act on the three-phase boundary. This makes it possible to provide the electrode with a higher activity, not to mention enhance the percent utilization of catalyst. This further makes it possible to prepare a high efficiency electrode for a fuel cell from a small amount of a catalyst material. Thus, an inexpensive high performance fuel cell can be prepared.

What is claimed is:

1. A solid polymer electrolyte-catalyst composite electrode for a fuel cell, wherein said electrode contains solid polymer electrolyte comprising proton-conductive passage and backbone, carbon particle, and catalyst material, wherein said catalyst material is mainly disposed in said proton-conductive passage of solid polymer electrolyte and on the site where the surface of said carbon particle contacts the passage of the solid polymer electrolyte.

2. The electrode according to claim 1, wherein said catalyst material has an average particle diameter of not more than 40 Å.

3. The electrode according to claim 1, wherein said catalyst material has an average particle diameter of from 20 Å to 40 Å.

4. The electrode according to claim 1, wherein said catalyst material comprises a platinum group metal or an alloy thereof.

5. The electrode according to claim 2, wherein said catalyst material comprises a platinum group metal or an alloy thereof.

6. The electrode according to claim 3, wherein said catalyst material comprises a platinum group metal or an alloy thereof.

7. A fuel cell comprising an electrode according to any of claims 1–4, 5 or 6.

* * * * *